(12) United States Patent  (10) Patent No.: US 6,272,890 B1
Huston  (45) Date of Patent: Aug. 14, 2001

(54) FORK LOCK COVER FOR MOTORCYCLE MOUNTED WITH TAPE AND METHOD

(76) Inventor: Fred Michael Huston, 2841 Saturn St., Unit L, Brea, CA (US) 92821

(*) Notice: Subject to any disclaimer, the term of this patent is extended or adjusted under 35 U.S.C. 154(b) by 0 days.

(21) Appl. No.: 09/385,653

(22) Filed: Aug. 27, 1999

(51) Int. Cl.⁷ .................................................. E05B 13/02
(52) U.S. Cl. ............................................. 70/423; 70/455
(58) Field of Search ........................... 70/423–428, 454, 70/455

(56) References Cited

U.S. PATENT DOCUMENTS

| | | | |
|---|---|---|---|
| 1,062,594 | 5/1913 | Isidor | 70/455 |
| 2,213,814 | 9/1940 | Jacobi | 70/455 |
| 2,355,300 | 8/1944 | Johnstone | 70/455 |
| 2,491,337 | 12/1949 | Segal | 70/455 X |
| 2,931,209 | 4/1960 | Dies et al. | 70/455 |
| 4,282,732 * | 8/1981 | Bennett | 70/455 |
| 4,597,274 | 7/1986 | Coscia | 70/455 |
| 4,700,556 * | 10/1987 | Wade, Sr. et al. | 70/423 X |
| 4,790,163 * | 12/1988 | Appelbaum | 70/455 |
| 4,799,565 | 1/1989 | Handa et al. | 70/455 X |
| 4,858,454 * | 8/1989 | McAnulty, III | 70/455 |
| 4,881,391 | 11/1989 | Villa | 70/455 |
| 4,914,554 * | 4/1990 | Sowers | 70/455 X |
| 5,003,795 * | 4/1991 | Hoke | 70/455 X |
| 5,563,387 * | 10/1996 | Myers et al. | 70/455 X |
| 5,615,567 * | 4/1997 | Kemp | 70/423 X |
| 5,718,137 | 2/1998 | Huston | 70/423 |
| 5,758,529 * | 6/1998 | Chhatwal | 70/423 |

FOREIGN PATENT DOCUMENTS

| | | | |
|---|---|---|---|
| 93771 | 7/1923 | (AT) . | |
| 588109 | 12/1959 | (CA) . | |
| 3544-749 | 6/1987 | (DE) . | |
| 392378 * | 10/1990 | (EP) | 70/423 |
| 588032 | 10/1924 | (FR) . | |
| 2239480 * | 7/1991 | (GB) | 70/423 |
| 226025 | 4/1969 | (SE) . | |

* cited by examiner

Primary Examiner—Suzanne Dino Barrett
(74) Attorney, Agent, or Firm—John J. Connors; Connors & Associates

(57) ABSTRACT

A motorcycle having a fork lock includes a cover which is adapted to be manually moved between a cover position where the cover overlies the fork lock and an uncovered position where the fork lock is exposed to allow a key to be inserted into the fork lock. The fork lock is attached to a mounting member carried between a pair of handle bars for the motorcycle. This mounting member includes a raised platform of a predetermined configuration in which the fork lock is seated. The cover includes a cover plate and a base plate, and the base plate has an underside to which is secured a double sided adhesive member. A first side of the adhesive member is bonded to the underside of the base plate and the second side of the adhesive member having an adhesive surface. The base plate includes a recess portion having a configuration substantially the same as the predetermined configuration of the raised platform, so that the base plate fits snugly over the platform and the planar surface contacts the second side of the adhesive member to bond this second side to the planar surface.

9 Claims, 5 Drawing Sheets

FORK LOCK COVER FOR MOTORCYCLE MOUNTED WITH TAPE AND METHOD

BACKGROUND OF THE INVENTION

Many motorcycles have a fork lock that locks the fork of the motorcycle in a cocked position. In some models, these locks also lock the ignition switch. These locks are conventional and have a recess into which a key is inserted. This recess, because it is uncovered, is exposed to the elements, and rain, ice, dirt or other debris can block this recess. It would be highly desirable to have a simple-to-install and use cover that would protect the fork lock from the elements, i.e., preventing rain, ice, dirt or other debris from entering the recess in the lock. Ideally, this cover should be simple to manufacture and install, and be durable and withstand weathering and corrosion.

In U.S. Pat. No. 5,718,137 and copending U.S. design patent application Ser. No. 29/096,611, entitled "Ornamental Motorcycle Fork Lock Cover," filed Nov. 16, 1998, both invented by the Applicant, there are disclosed fork lock covers. In particular, the fork lock cover disclosed in U.S. Pat. No. 5,718,137 is designed to be installed on a motorcycle that has a mounting member on the fork adapted to receive screws that secure the fork lock cover to this mounting member. Many motorcycles, however, do not have such a mounting member that permits the fork lock cover to be screwed into position.

SUMMARY OF THE INVENTION

The fork lock cover of this invention is designed to be attached securely to a mounting member on a fork of a motor cycle that does not have a convenient way to screw the fork lock cover to the mounting member.

This invention has several features, no single one of which is solely responsible for its desirable attributes. Without limiting the scope of this invention as expressed by the claims that follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include convenience of installation, low cost and precision manufacture, durability, and protection of a fork lock from the elements.

The first feature of the cover for a fork lock of a motorcycle of this invention is that it includes a cover plate and a base plate attached together by a pivot member. Preferably, the cover plate and the base plate each have a substantially trapezoidal-like configuration and each have essentially the same dimensions. There is an opening in the base plate that provides access to the fork lock when the base plate is attached to the motorcycle. The base plate has an underside to which is secured a double-sided adhesive member. One side of the adhesive member, which has an adhesive surface, is bonded to the underside of the base plate. Preferably, the underside of the base plate includes a recess portion that is sized to fit snugly over a mounting member for the fork lock. The other side of the adhesive member has an adhesive surface that is covered by a removable sheet member that protects this side until the cover is installed. The pivot member pivotally connects the cover plate to the base plate to enable the cover plate to be rotated with respect to the base plate to expose the opening in the base plate, so that a key may be inserted into the fork lock. There is an "O" ring in an underside of the cover plate that is seated around the opening in the base plate when the cover plate is in a closed position.

The second feature is that there is at least one detent member disposed between the base plate and the cover plate that maintains the relative position of the cover plate to the base plate. Consequently, the cover plate overlies the base plate to cover the opening until a turning force is applied to the cover plate. There also is a spacer positioned between the cover plate and the base plate. This spacer is coupled to the cover plate to rotate as the cover plate is rotated. Each detent member includes a spring element seated in a bore and a ball resting on the spring and partially seated in a hemispherical recess when the recesses are aligned with the balls. Preferably, there are a plurality of detent members and corresponding hemispherical recesses aligned with the detent members. Thus, as the cover plate is rotated with respect to the base plate, each ball of each detent member is forced into its respective bore to compress the spring in its respective bore and roll across the cover plate between the hemispherical recesses. The balls are forced into a recess by the springs when the recesses are aligned with the balls. Each detent member is spaced at 90 degrees with respect to each other and each recess spaced at 90 degrees with respect to each other.

The third feature is that the motorcycle includes a mounting member having a raised platform of a predetermined configuration in which the fork lock is seated. The raised platform has a substantially planar surface. The base plate includes a recess portion having a configuration substantially the same as the predetermined configuration of the raised platform. The mounting member has outwardly tapered side wall at a predetermined angle and the cover plate and base plate each have side walls with exterior surfaces that are outwardly tapered at substantially the same angle as the predetermined angle. The side wall of the base plate forms the recess portion of the base plate and has an inner surface that is tapered at substantially the same angle as the predetermined angle. Consequently, the base plate fits snugly over the platform and the planar surface contacts the adhesive surface of the adhesive member and bonds thereto. Preferably, the planar surface has a cavity therein having a predetermined configuration and predetermined depth. The adhesive member has a configuration which substantially fills the predetermined configuration of the cavity. Also, the adhesive member has a thickness substantially equal to the predetermined depth of the cavity, preferably being slightly greater than the depth of the cavity.

This invention also includes a method for protecting from the elements a fork lock attached to a mounting member on a motorcycle. This method comprises the steps of (a) providing a cover for the fork lock, said cover including
- a cover plate and base plate attached together in a manner that permits the cover plate to move relative to the base plate,
- said base plate having an opening which provides access to the fork lock when the base plate is attached to the mounting member,
- said base plate having an underside to which is secured a double sided adhesive member, one side of the adhesive member being bonded to the underside of the base plate and the other side of the adhesive member having an adhesive surface that is covered by a removable sheet member, (b) removing the sheet member to expose the adhesive surface and positioning the cover over the fork lock, (c) aligning the opening in the base plate with the fork lock, so that upon moving the cover plate relative to the base plate after attachment of the cover to the mounting member the fork lock may be accessed through said opening, and (d) pressing the base plate against the mounting member to bond the cover to the mounting member.

Preferably, the mounting member is cleaned prior to attachment of the cover to the mounting member. Cleaning is accomplished by washing the surface of the mounting member with a solvent.

DESCRIPTION OF THE DRAWING

The preferred embodiment of this invention, illustrating all its features, will now be discussed in detail. This embodiment depicts the novel and non-obvious fork lock cover of this invention as shown in the accompanying drawing, which is for illustrative purposes only. This drawing includes the following figures (FIGS.), with like numerals indicating like parts.

DESCRIPTION OF THE PREFERRED EMBODIMENT

Figure 1A:
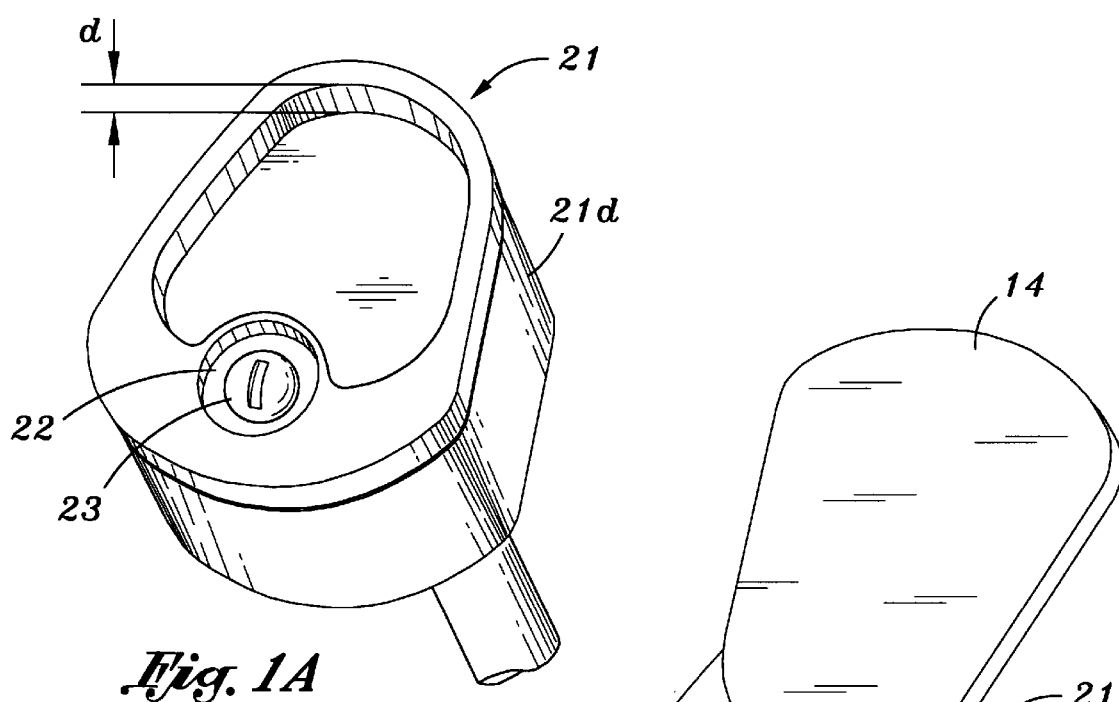
FIG. 1A is a perspective view of the mounting member of a motorcycle that does not have way of screwing the fork lock cover to the mounting member.
Figure 1B:
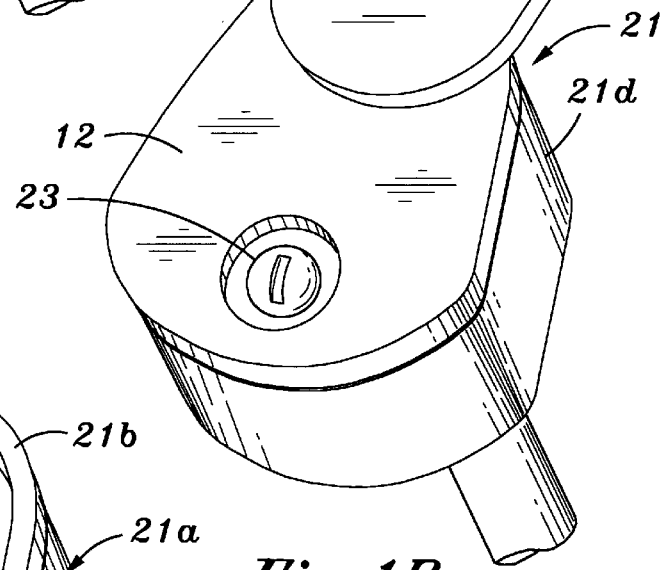
FIG. 1B is a perspective view of the fork lock cover of this invention attached securely to the mounting member of a motorcycle that does not have a way of screwing the fork lock cover to the mounting member.
Figure 1C:
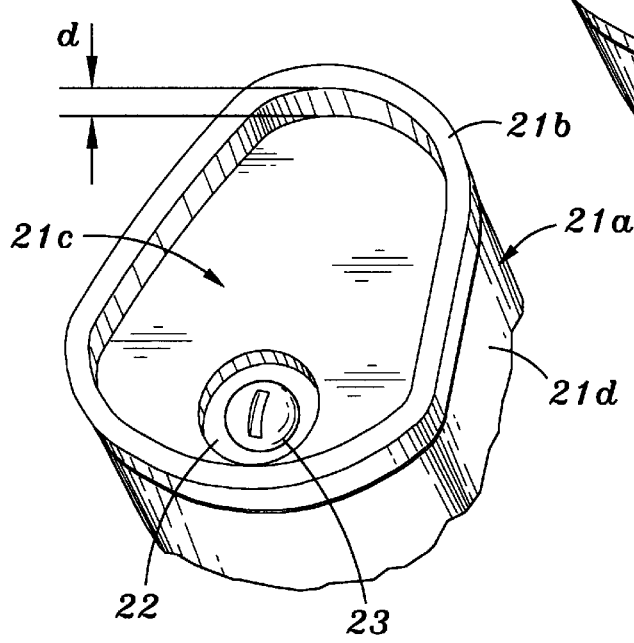
FIG. 1C is an enlarged, fragmentary perspective view of the platform of the mounting member.
Figure 2:
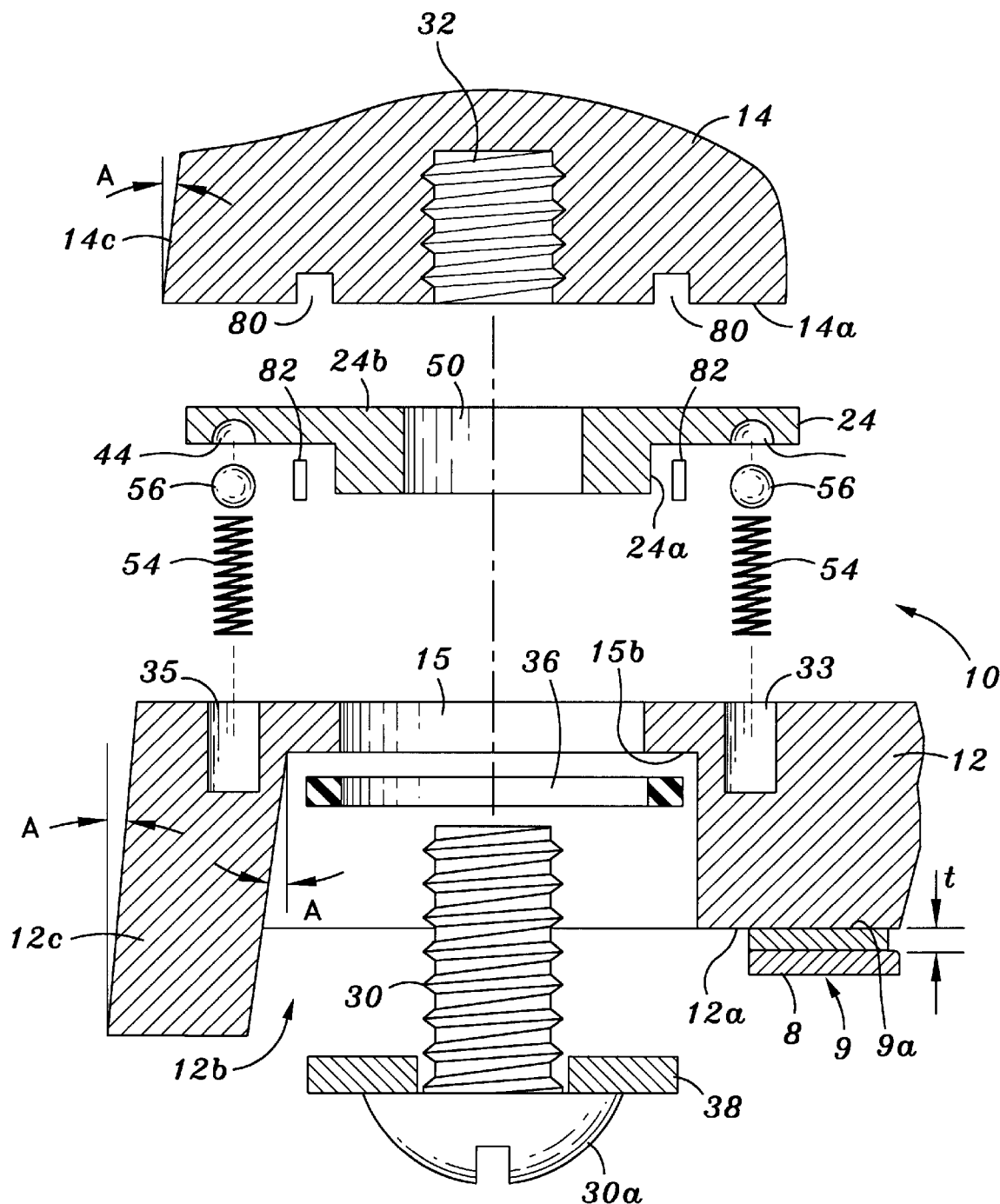
FIG. 2 is an exploded, cross-sectional view of the cover plate and base plate aligned and ready to be assembled.
Figure 8:
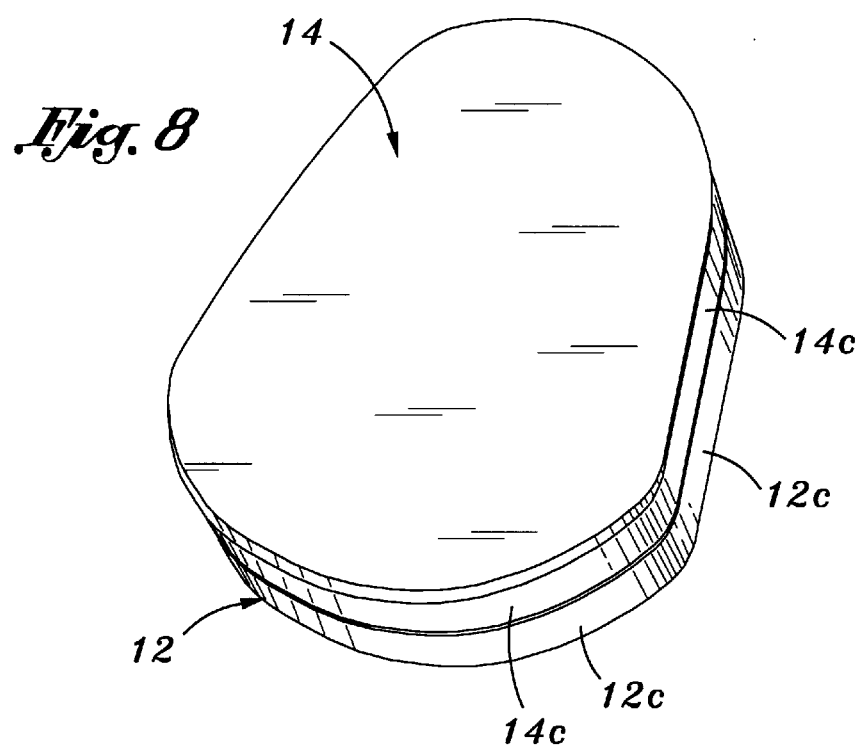
FIG. 8 is a perspective view of the cover with the cover plate overlying the base plate.

As best illustrated in FIGS. 1A through 4, the fork lock cover 10 of this invention includes a base plate 12 and a cover plate 14. The base plate 12 and cover plate 14 each have a trapezoidal-like configuration with about the same dimensions. As best illustrated in FIGS. 2 and 8, each also have outwardly tapered walls 12c and 14c, respectively. Consequently, when the cover plate 14 overlies the base plate 12 as shown in FIG. 8, the exterior surfaces of these outwardly tapered walls 12c and 14c are flush with each other. Typically, the length of the base plate 12 and cover plate 14 each range from about 1½ to about 2½ inches, and the width of the base plate 12 and cover plate 14 each range from about 1½ to about 2 inches. The base plate 12 and cover plate 14 are aligned upon assembly as shown in FIG. 2. In the base plate 12, there is a hole 15 and an opening 18.

When the cover 10 is secured to a mounting member 21 for a fork lock 23 positioned, for example, on a dash board (not shown) of a motorcycle (not shown), the opening 18 overlies a recess 22 (FIG. 1b) into which a key for the fork lock 23 is inserted.

In a accordance with this invention, the cover 10 is designed to be fastened to the mounting member 21 by an adhesive member 9 such as, for example, a double sided tape sold by 3M Corporation. The adhesive member 9 has a C-shape. The mounting member 21 includes a platform 21A and outwardly tapered side walls 21d. The platform 21A has a trapezoidal-like configuration similar to the trapezoidal-like configurations of the base plate 12 and the cover plate 14. The platform 21A has a substantially planar surface 21b, with a cavity 21c therein. The fork lock 23 protrudes slightly from the cavity 21 like an island.

Figure 3:
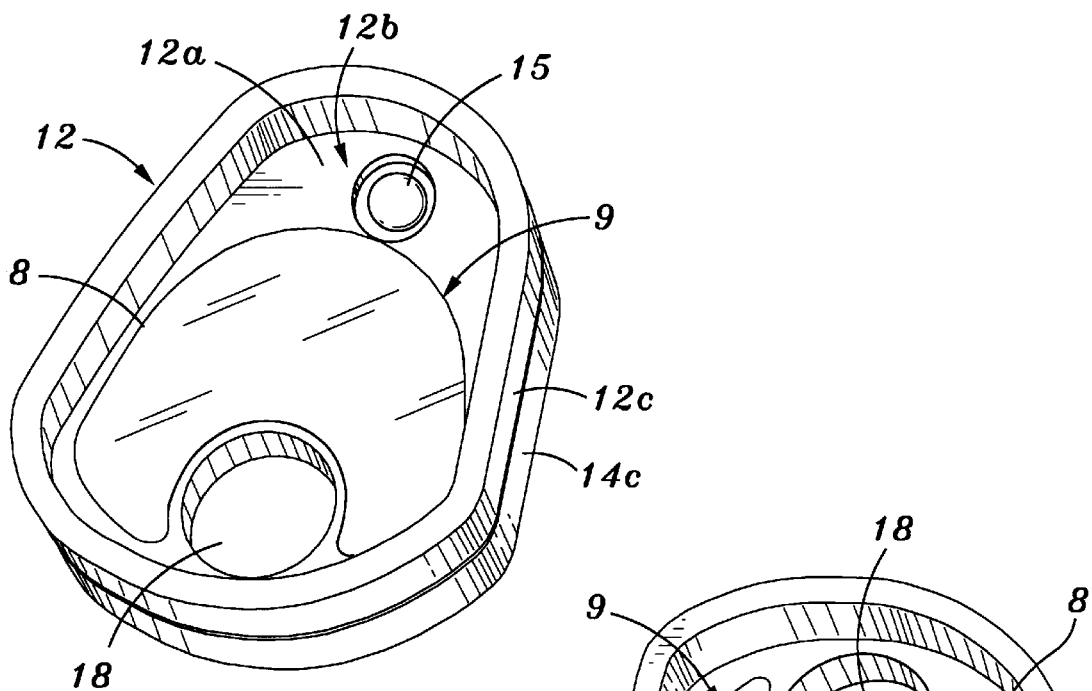
FIG. 3 is a perspective view of the underside of the base plate of the fork lock cover of this invention.
Figure 4:
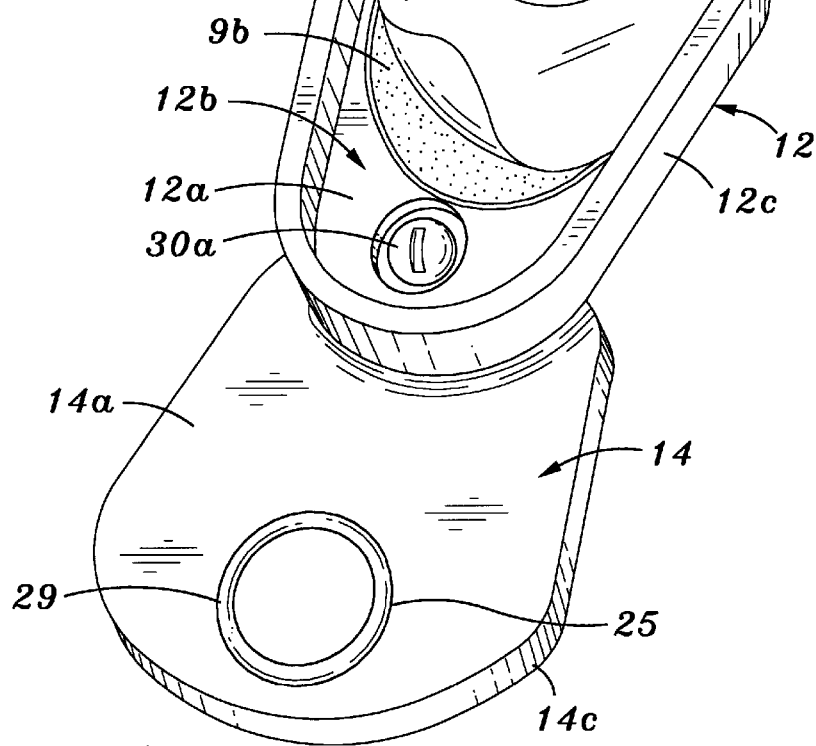
FIG. 4 is a perspective view of the underside of the assembled base plate and cover plate of the fork lock cover of this invention, showing the removable protective sheet member partially removed.

As best shown in FIGS. 3 and 4, the base plate 12 has an underside to which is secured the double sided adhesive member 9. One side 9a (FIGS. 2, 3 and 4) of the adhesive member 9 has an adhesive surface and is bonded to an underside 12a of the base plate. This underside 12a is substantially planar. The other side 9b of the adhesive member has an adhesive surface which, prior to attachment of the cover 10 to the mounting member 21, is covered with a protective sheet 8. As shown in FIG. 4, this protective sheet 8 is manually removed when the cover 10 is to be attached to the mounting member 21.

The base plate 12 includes recess 12b having a trapezoidal-like configuration substantially the same as the configuration of the raised platform 21A. The recess 12b is formed by the outwardly tapered, trapezoidal-like wall 12c. As best illustrated in FIG. 2, the inner surface of the wall 12c is also tapered inwardly at substantially the same angle A as the taper of the exterior of the mounting member wall 21d. The taper of the exterior surface of the wall 14c of the cover plate 14 is also at the same angle A. Typically this angle A ranges from about 5 to 10 degrees. Because of the taper of the inner surface of the wall 12c, upon assembly, the base plate 12 fits snugly over the platform 21A, with the platform being received within the recess 12b and the exterior surface of the wall 21d abutting the inner surface of the wall 12c.

Before attaching the cover 10 to the platform 21A, this platform is cleaned, for example by washing with a solvent such as, for example, alcohol and acetone. The protective sheet 8 is removed, and the base plate 12 is then pushed inward until the planar surface 21b contacts the exposed adhesive on the side 9b to bond the cover 10 to the planar surface. The cavity 21c has a depth d that is substantially equal to the thickness t of the adhesive member 9 with the protective sheet 8 removed. Typically, this depth ranges between about 0.015 and about 0.040 inch. For example, if the depth of the cavity 21c is about 0.30 inch, the thickness t of the adhesive member 9 with the protective sheet 8 removed is about 0.040. As best illustrated in FIGS. 3 and 4, the adhesive member 9 substantially fills the cavity 21c. This arrangement better insures that there is a strong bond between the adhesive member 9 and the raised platform 21A, because the adhesive member 9 with the protective sheet 8 removed goes into compression upon assembling the cover 10 and the mounting member 21.

The cover 10 is, in other respects, similar to the cover disclosed in U.S. Pat. No. 5,718,137. As depicted in FIG. 4, an O-ring 29 is seated in an annular groove 25 which is concentric with the opening 18 of the cover plate 14 when the cover plate is in a fully closed position as shown in FIG. 8. A threaded counterbore 15a in an enlarged peripheral hole 15 of the cover plate 14 allows a screw 30 to be screwed into a threaded bore 32 in the underside of the cover plate 14, after first passing through the hole 15 in the base plate 12. The screw 30 serves as a pivot member. The head 30a of the screw 30 is seated in the counterbore 15a as shown in FIG. 4. There are three bores, only bores 33 and 35 shown, positioned about the hole 15. Each of these three bores is offset 90 degrees with respect to an adjacent bore.

The screw 30 passes through the hole 15 and a passageway 50 in a spacer member 24 to connect the base plate 12 to the cover plate 14 with the spacer member disposed between the cover and base plates. This spacer member 24 has a generally circular configuration, with the side of the spacer member 24 facing the base plate 12 having an annular rim 24a which fits into the opening 15 in the base plate 12. There is a land 15b in the opening 15 on which rests a nylon washer 36 that is lodged between the rim 24a and a washer 38 seated on the head 30a of the screw 30. There are holes 24b passing through the rim 24a that are aligned with bores 80 on the underside 14a of the cover plate 14. Pins 82 are force fitted into and through the holes 24b and into the bores 80 to secure in a fixed position the spacer member 24 to the underside 14a of the cover plate 14. Consequently, with the rotation of the cover plate 14, the spacer member 24 rotates about the screw 30. The spacer member 24 may, however, be attached to the cover plate 14 in any other suitable manner such as by soldering, gluing, or as depicted in U.S. Pat. No. 5,718,137.

Figure 5:
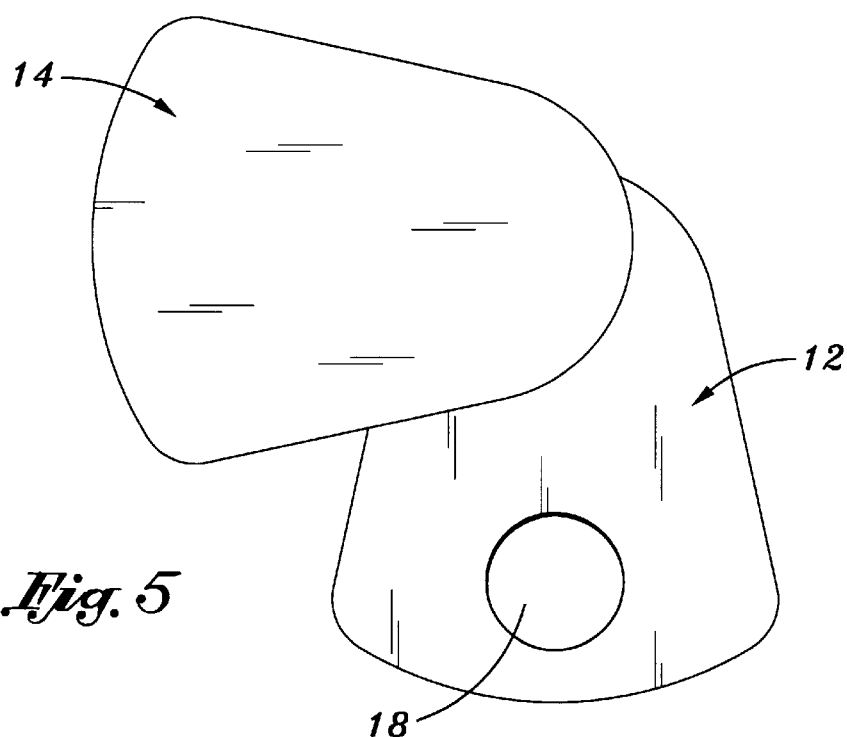
FIG. 5 is a plan view showing one uncovered position illustrating the relative positions of the base and cover plates.
Figure 6:
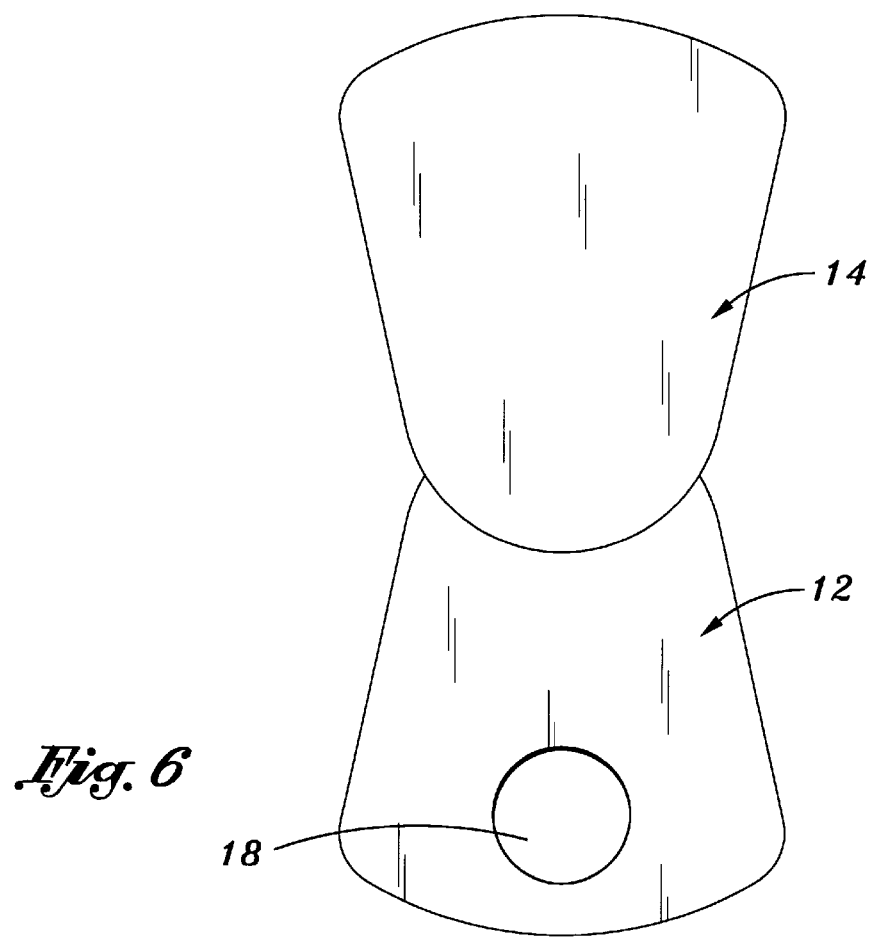
FIG. 6 is a plan view showing another uncovered position illustrating the relative positions of the base and cover plates.
Figure 7:
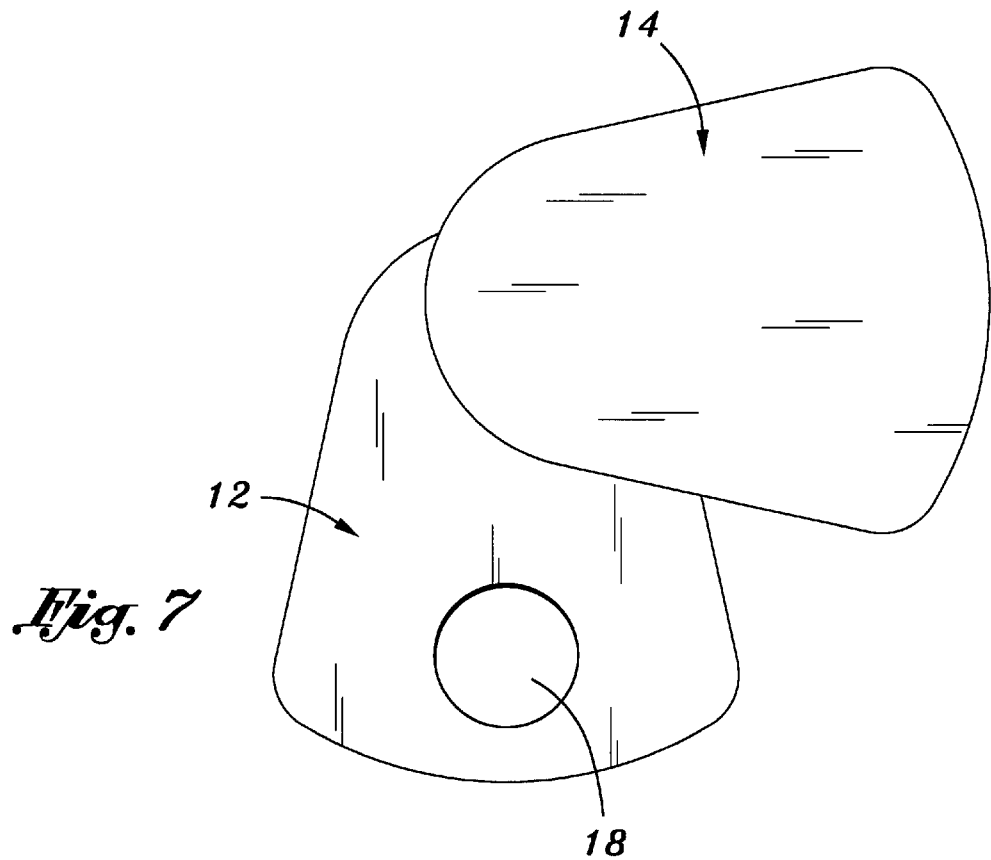
FIG. 7 is a plan view showing a third uncovered position illustrating the relative positions of the base and cover plates.

The side of the spacer member 24 adjacent the topside of the base plate 12 has four hemispherical recesses or indentations (only indentations 44 and 46 being shown) located around the passageway 50 in the spacer member 24. Each of these four hemispherical indentations is offset 90 degrees with respect to an adjacent hemispherical indentation. Seated in the bores 33, 35 etc. in the base plate 12 are springs 54 with balls 56 resting on top of these springs. The hemispherical indentations 44, 46 etc. are at 90 degrees with respect to each other, and are aligned with at least three of the balls 56 at four different positions. The balls 56, resting on the springs 54 in the bores 33, 35 etc., serve as detent members which maintain the relative position of the cover plate 14 to the base plate 12, until a turning force is applied to the cover plate. As the cover plate 14 is rotated with respect to the base plate 12, each ball 56 of each detent member is forced into its respective bore 33, 35 etc. This compresses each spring 54 in its respective bore and the balls 56 roll across the underside of the cover plate 14 between the hemispherical indentations 44, 46 etc., with the balls being forced into an indentation by the springs when the indentations are aligned with the balls. Consequently, when a turning force is applied to the cover plate 14, it slides across the inside surface of the base plate 12 to expose the central opening 18. There are four different positions established by the detent members. One of these, as shown in FIG. 1A, totally covers the opening 18 to prevent access to the key recess 22. The other three, respectively shown in FIGS. 5 through 7, totally expose the opening 18 to allow a key to access the recess 22.

After attaching the cover 10 of this invention to the fork lock 23 of the motorcycle 20, the cover is maintained in a position where it totally covers the central opening 18 in the base plate 12 as shown in FIG. 1A. To expose the key recess 22, the motorcyclist manually rotates the cover plate 14 either 90° or 180°, either clockwise or counter-clockwise as viewed in FIGS. 5–7, to a position where the central opening 18 is totally exposed to allow access to the key recess 22. The cover plate 14 slides across the surface of the base plate 12 as it moves between a cover position and an uncovered position. After locking the fork lock 23, the cover plate 14 is returned to the position shown in FIG. 1A by sliding it across the surface of the base plate 12 to cover the base plate 12 and the central opening 18 after withdrawal of the key.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A cover for a fork lock of a motorcycle, including a cover plate, a base plate having an opening which provides access to the fork lock when the base plate is attached to the motorcycle, said cover plate and base plate each having a substantially trapezoidal-like configuration and each having essentially the same dimensions, and said base plate having an underside to which is secured a double sided adhesive member, one side of the adhesive member being bonded to the underside of the base plate and the other side of the adhesive member having an adhesive surface that is covered by a removable sheet member, said underside of the base plate including a recess portion formed by a wall having a trapezoidal-like configuration and including an inner surface adapted to engage a sidewall of a mounting platform, said sidewall of the mounting platform having an exterior surface with a trapezoidal-like configuration, said wall of the base plate being sized to fit snugly over the mounting platform for the fork lock with the sidewall of the mounting platform being received within the recess portion and the exterior surface of the sidewall abutting the inner surface of the wall of the base plate, a pivot member pivotally connecting the cover plate to the base plate to enable the cover plate to be rotated with respect to the base plate to expose the opening so that a key may be inserted into the fork lock, at least one detent member disposed between the base plate and the cover plate that maintains the relative position of the cover plate to the base plate so that the cover plate overlies the base plate to cover said opening until a turning force is applied to the cover plate.

2. The cover of claim 1 where there is an "O" ring in an underside of the cover plate that is seated around the opening in the base plate when the cover plate is in a closed position.

3. The cover of claim 1 where including a spacer positioned between the cover plate and the base plate, said spacer being coupled to the cover plate to rotate as said cover plate is rotated.

4. The cover of claim 1 where each detent member includes a spring element seated in a bore and a ball resting on the spring and partially seated in a hemispherical recess when the recesses are aligned with the balls.

5. The cover of claim 4 where there are a plurality of detent members and corresponding hemispherical recesses aligned with the detent members, so that as the cover plate is rotated with respect to the base plate, each ball of each detent member is forced into a corresponding bore to compress the spring in said corresponding bore and roll across the cover plate between the hemispherical recesses, with the balls being forced into a recess by the springs when the recesses are aligned with the balls.

6. The cover of claim 5 each detent member is spaced at 90 degrees with respect to each other and each recess spaced at 90 degrees with respect to each other.

7. A motorcycle including
  a fork lock attached to a mounting member carried by the motorcycle,
  said mounting member including a raised platform in which the fork lock is seated, said raised platform having a substantially planar surface and a sidewall having an exterior surface with a trapezoidal-like configuration,
  a cover including a cover plate and a base plate, said cover plate and base plate each having a substantially trapezoidal-like configuration and each having essentially the same dimensions,
  said cover plate being adapted to be manually moved between a cover position where the cover plate overlies the fork lock and an uncovered position where the fork lock is exposed to allow a key to be inserted into the fork lock,
  said base plate having an underside to which is secured a double sided adhesive member, a first side of the adhesive member being bonded to the underside of the base plate and the second side of the adhesive member having an adhesive surface,
  said base plate including a recess portion formed by a wall having a trapezoidal-like configuration and including an inner surface adapted to engage the sidewall of the platform with the planar surface contacting the adhesive surface of the adhesive member and bonding thereto,
  said wall of the base plate being sized to fit snugly over the platform with the sidewall of the platform being received within the recess portion and the exterior surface of the sidewall abutting the inner surface of the wall of the base plate, and
  a detent member which maintains the relative position of the cover to the motorcycle so that the cover overlies the fork lock to cover said fork lock until a turning force is applied to the cover to move said cover between the cover position and the uncovered position.

8. The motorcycle of claim 7 where the sidewall of the platform is outwardly tapered at a predetermined angle and the cover plate has trapezoidal-like wall, and the walls of the cover plate and base plate each have exterior surfaces that are outwardly tapered at substantially the same angle as said predetermined angle, and the wall of the base plate forming the recess has an inner surface that is tapered at substantially the same angle as said predetermined angle.

9. The motorcycle of claim 8 wherein the planar surface has a cavity therein having a predetermined configuration and predetermined depth, and said adhesive member has a configuration which substantially fills the predetermined configuration of the cavity and said adhesive member has a thickness substantially equal to the predetermined depth of the cavity.

* * * * *